US012630394B2

(12) United States Patent
Kato et al.

(10) Patent No.: US 12,630,394 B2
(45) Date of Patent: May 19, 2026

(54) ELEVATOR ROPE INSPECTION DEVICE AND METHOD FOR INSPECTING AN ELEVATOR ROPE

(71) Applicants: Otis Elevator Company, Farmington, CT (US); Meidensha Corporation, Tokyo (JP)

(72) Inventors: Mitsuru Kato, Inzai-City (JP); Hideki Miyazawa, Sakura (JP); Yoshiki Nota, Tokyo (JP); Yusuke Watabe, Tokyo (JP)

(73) Assignees: OTIS ELEVATOR COMPANY, Farmington, CT (US); MEIDENSHA CORPORATION, Tokyo (JP)

( * ) Notice: Subject to any disclaimer, the term of this patent is extended or adjusted under 35 U.S.C. 154(b) by 1619 days.

(21) Appl. No.: 16/551,963

(22) Filed: Aug. 27, 2019

(65) Prior Publication Data

US 2020/0071130 A1 Mar. 5, 2020

(30) Foreign Application Priority Data

Aug. 29, 2018 (JP) ................................ 2018-160438

(51) Int. Cl.
*B66B 5/00* (2006.01)
*B66B 3/00* (2006.01)
*B66B 7/12* (2006.01)

(52) U.S. Cl.
CPC .............. *B66B 7/1238* (2013.01); *B66B 3/00* (2013.01); *B66B 5/0025* (2013.01); *B66B 5/0031* (2013.01); *B66B 5/0037* (2013.01)

(58) Field of Classification Search
CPC ... B66B 7/1238; B66B 7/1215; B66B 5/0025; B66B 5/0037; B66B 1/3492; B66B 7/06;
(Continued)

(56) References Cited

U.S. PATENT DOCUMENTS 6,038,335 A 3/2000 Yokoyama et al.
7,117,981 B2 * 10/2006 Logan .................... D07B 1/148 73/158
(Continued)

FOREIGN PATENT DOCUMENTS

CN 101259931 A * 9/2008
CN 104063716 A 9/2014
(Continued)

OTHER PUBLICATIONS

Nippon Otis, "Nippon Otis Advances Innovative Camera-Based Elevator Rope Inspection System", Otis Elevator Company, Mar. 21, 2017, 3 pages.
(Continued)

*Primary Examiner* — Christopher Uhlir
(74) *Attorney, Agent, or Firm* — CANTOR COLBURN LLP

(57) ABSTRACT

An elevator-rope inspection device comprising a camera for capturing images of the elevator rope R, and an image-processing unit for processing a captured image outputted by the camera, wherein the image-processing unit detects a location of wear by implementing binarization on the captured images, and a labeling process that assigns a label to the location of wear, measures a distance between labels 1, 2, and 3 assigned by the labeling process, and when that distance is less than a fixed value, it judges that the area between labels is a wire break, so texture information of the elevator rope is unnecessary in advance.

12 Claims, 4 Drawing Sheets

(58) Field of Classification Search

CPC ........... B66B 5/02; B66B 3/00; B66B 5/0006; B66B 3/002; B66B 5/0087; B66B 7/12; B66B 25/006; B66B 3/02; B66B 5/185; B66B 7/1284; B66B 5/00; B66B 5/0018–0031; B66B 5/12; B66B 5/125

See application file for complete search history.

(56) References Cited

U.S. PATENT DOCUMENTS

| | | | | |
|---|---|---|---|---|
| 9,665,932 | B2 | 5/2017 | Lauffer et al. | |
| 10,311,322 | B2 * | 6/2019 | Fei | G06V 10/761 |
| 10,859,372 | B2 * | 12/2020 | Dou | G01N 21/88 |
| 10,994,968 | B2 * | 5/2021 | Kato | B66B 7/1238 |
| 2018/0105393 | A1 * | 4/2018 | Miyajima | B66B 7/1215 |

FOREIGN PATENT DOCUMENTS

| | | | | | |
|---|---|---|---|---|---|
| CN | 102602759 | B | | 12/2014 | |
| CN | 103163150 | B | | 7/2015 | |
| CN | 103387171 | B | | 9/2016 | |
| CN | 104515777 | B | | 3/2017 | |
| CN | 106477411 | A | | 3/2017 | |
| CN | 104535356 | B | | 8/2017 | |
| CN | 107038701 | A | | 8/2017 | |
| CN | 107132232 | A | | 9/2017 | |
| CN | 107290349 | A | | 10/2017 | |
| CN | 107703148 | A | | 2/2018 | |
| CN | 107764839 | A | | 3/2018 | |
| CN | 107922153 | A | | 4/2018 | |
| CN | 108069318 | A | | 5/2018 | |
| CN | 114072346 | A | * | 2/2022 | B66B 7/1238 |
| EP | 3135621 | A1 | * | 3/2017 | B66B 1/30 |
| EP | 3617123 | A1 | * | 3/2020 | B66B 3/00 |
| EP | 3617124 | A1 | * | 3/2020 | B66B 5/0031 |
| JP | 3333568 | B2 | | 10/2002 | |
| JP | 2004203530 | A | | 7/2004 | |
| JP | 4168863 | B2 | | 10/2008 | |
| JP | 2009012903 | A | | 1/2009 | |
| JP | 2009057126 | A | | 3/2009 | |
| JP | 2009184769 | A | * | 8/2009 | |
| JP | 4694915 | B2 | | 6/2011 | |
| JP | 2011107056 | A | | 6/2011 | |
| JP | 2011196730 | A | | 10/2011 | |
| JP | 5100453 | B2 | | 12/2012 | |
| JP | 2013147315 | A | | 8/2013 | |
| JP | 5463404 | B2 | | 4/2014 | |
| JP | 2014101197 | A | * | 6/2014 | |
| JP | 6009395 | B2 | | 10/2016 | |
| JP | 6271680 | B1 | * | 1/2018 | B66B 5/0025 |
| JP | 2021020790 | A | * | 2/2021 | |
| KR | 20070065723 | A | * | 2/2007 | |
| WO | WO-2010092619 | A1 | * | 8/2010 | B66B 7/1238 |
| WO | 2013145823 | A1 | | 10/2013 | |
| WO | 2017195352 | A1 | | 11/2017 | |
| WO | WO-2018101296 | A1 | * | 6/2018 | B66B 5/0031 |
| WO | WO-2018139434 | A1 | * | 8/2018 | B66B 5/0037 |
| WO | WO-2021032903 | A1 | * | 2/2021 | B66B 7/1238 |
| WO | WO-2021032904 | A1 | * | 2/2021 | B66B 7/1238 |

OTHER PUBLICATIONS

Sioma, Andrzej, “3D vision system performs rope wear analysis”, Control Engineering, Apr. 22, 2013, 6 pages.

European Search Report for application EP 19194492.5, dated Jan. 31, 2020, 80 pages.

* cited by examiner

ELEVATOR ROPE INSPECTION DEVICE AND METHOD FOR INSPECTING AN ELEVATOR ROPE

FOREIGN PRIORITY

This application claims priority to Japanese Patent Application No. 2018160438, filed Aug. 29, 2018, and all the benefits accruing therefrom under 35 U.S.C. § 119, the contents of which in its entirety are herein incorporated by reference.

TECHNICAL FIELD

The present invention relates to elevator-rope inspection devices and elevator-rope inspection methods. Specifically, the present invention relates to a non-contact technique for inspecting for wear marks in a rope wire, and broken rope wire by processing image data of an elevator rope (hereinafter simply referred to as a rope) captured by a camera, near an elevator hoisting machine, using an analysis device.

BACKGROUND ART

Disclosed in patent document 1 is "a wire rope wire break inspection device for an elevator and method therefor," so that rope wire breakage does not lead to a strand breakage accident, by inspecting a status of a wire rope wire breakage for an elevator in advance.

Disclosed in patent document 2 is "a wire rope inspection device" that analyzes a status of the wire rope using captured images of the wire rope.

Disclosed in patent document 3 is "a rope deformity inspection device for elevators" that uses laser light and a camera.

Disclosed in patent document 4 is "a wire rope inspection device" that continually captures the wire rope and associates the captured images to the wire rope position.

PRIOR ART DOCUMENTS

Patent Documents

- Patent Document 1 Unexamined Patent Application Publication 2009-12903
- Patent Document 2 International Publication: No. 2013/145823
- Patent Document 3 Unexamined Patent Application Publication 2009-57126
- Patent Document 4 Unexamined Patent Application Publication 2011-107056

SUMMARY OF THE INVENTION

Problems to be Solved by the Invention

Patent document 1 inspects the status of the wire rope wire breakage for an elevator in advance, so that rope wire breakage does not lead to a strand breakage accident. However, a measurement method of a continuous rope image texture is unclear.

In patent document 2, a state of the wire rope is analyzed using images of the captured wire rope, but it is a premise that a texture of the rope images that is captured is always constant, but an amount of wear in the rope surface is not measured.

In patent document 3, a laser light and a camera are used in conjunction, but an amount of wear is not measured.

In patent document 4, the wire rope is continually captured, and the captured image and wire rope position are associated, but an amount of wear is not measured.

Means for Solving the Problems

The elevator-rope inspection device according to claim 1 in the present invention for solving the problem comprises a camera for capturing images of one or a plurality of elevator ropes, and an image-processing unit for processing a captured image outputted by the camera, wherein the image-processing unit detects a location of wear by implementing binarization on the captured images, and a labeling process that assigns a label to the location of wear, measures a distance between labels assigned by the labeling process, and when that distance is less than a fixed value, judges that the area between labels is a wire break.

The elevator-rope inspection device according to claim 2 in the present invention for solving the problem, wherein the location of wear is detected by implementing a binarization process on captured images.

The elevator-rope inspection device according to claim 3 in the present invention for solving the problem, wherein the image-processing unit assigns consecutive numbers to locations of wear when implementing the labeling process and records a coordinate of a position of the location of wear and a region of the location of wear as an amount of wear.

The elevator-rope inspection device according to claim 4 in the present invention for solving the problem, wherein the image-processing unit issues a warning when an area between labels is judged to be a wire break.

The elevator rope inspection device according to claim 5 in the present invention for solving the problem, wherein a line-sensor camera or an area camera is used as the camera.

The elevator-rope inspection device according to claim 6 in the present invention for solving the problem, further comprising an image-recording unit for recording captured images outputted by the camera.

The elevator-rope inspection method according to claim 7 in the present invention for solving the problem comprises a camera for capturing images of one or a plurality of elevator ropes, and an image-processing unit for processing a captured image outputted by the camera, wherein the image-processing unit detects a location of wear by implementing binarization on the captured images, and a labeling process that assigns a label to the location of wear, measures a distance between labels assigned by the labeling process, and when that distance is less than a fixed value, judges that the area between labels is a wire break.

The elevator-rope inspection method according to claim 8 in the present invention for solving the problem, wherein the location of wear is detected by implementing a binarization process on captured images.

The elevator-rope inspection device according to claim 9 in the present invention for solving the problem, wherein the image-processing unit assigns consecutive numbers to locations of wear when implementing the labeling process and records a coordinate of a position of the location of wear and a region of the location of wear as an amount of wear.

The elevator-rope inspection method according to claim 10 in the present invention for solving the problem, wherein a warning is issued when an area between labels is judged to be a wire break.

The elevator-rope inspection method according to claim 11 in the present invention for solving the problem, wherein a line-sensor camera or an area camera is used as the camera.

The elevator-rope inspection device according to claim 12 in the present invention for solving the problem, further comprising an image-recording unit for recording captured images outputted by the camera.

Effect of the Invention

According to the present invention, an effect is attained of measuring a break in the rope wire even without texture information of the rope in advance.

Also, in addition to measuring a break in the rope wire, an effect is attained of detecting a region of a worn portion as an amount of wear.

Furthermore, when it is judged that the wire is broken, the invention issues a warning, attaining an effect of increasing safety.

A line-sensor camera capable of high-speed capturing is used as the camera, attaining an effect of being able to capture images even when the elevator is rising or lowering at high speed. Also, by using an area camera capable of measuring color information, it is advantageous in that ex post facto confirmation is easy.

By further constituting an image-recording unit to record captured images outputted by the camera, an effect is attained of making it possible to check captured images when the rope wire breaks, a result of image processing by an image-processing unit.

MODE FOR CARRYING OUT THE INVENTION

There are several methods for non-contact measuring of an elevator rope; the present invention relates to a camera-type inspection device.

By using a camera as a measuring device, it is possible to measure breaks or wear marks for a plurality elevator rope wires at one time.

Conventionally, a method has been proposed to measure a break in elevator rope wire by using a camera, but in order to measure breaks in the rope wire, it was necessary to obtain texture information or the like that indicates a break in the wire in advance.

There, with the present invention, firstly, the inspection device for wire breakages was attained that does not require obtaining data in advance by measuring a status of wear on a surface of the rope wire using images, and next measuring the breakage of the rope wire using that information.

Embodiment 1

Figure 1:
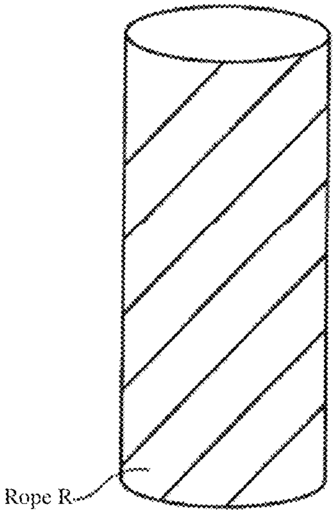
FIG. 1 is a schematic view of an elevator-rope inspection device according to a first embodiment of the present invention.
Figure 1:
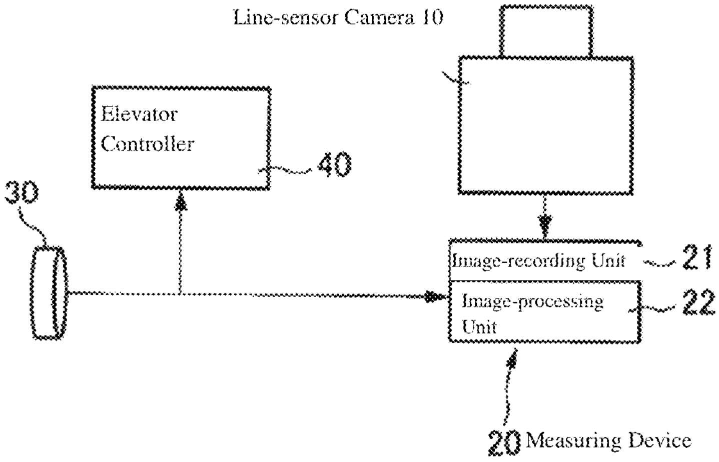

FIG. 1 is a view of an elevator-rope inspection device according to the first embodiment of the present invention.

As shown in FIG. 1, the elevator-rope inspection device in this embodiment is composed of one line-sensor camera 10 that captures a rope R, and a measuring device 20 inputted with captured images outputted by this line-sensor camera 10.

Rope R is constituted by spirally winding one or a plurality of strands around a core line; each strand is composed of a plurality of wires. The line-sensor camera 10 shown in FIG. 1 is in a state to capture the rope R near an elevator hoisting machine (not shown in the drawings).

The line-sensor camera 10 is a camera capable of high-speed capturing, arranged with a plurality of pixels in a row (one line); a line direction is a horizontal direction, which is a thickness direction of the rope R.

The line-sensor camera 10 continually captures the rope R passing by, composes the images in time series, and outputs the composed captured images to the measuring device 20. In other words, the one line of images continually captured by the line-sensor camera 10 are one-dimensional, but the captured images composed of the images in one line in time series are two dimensional. Also, the time-series composition may also be implemented by an image-processing unit 22 in the measuring device 20.

In the drawing, there is one rope R captured by the line-sensor camera 10, but it is not limited thereto. There may also be a plurality of ropes. In other words, the elevator-rope inspection device in this embodiment can implement image processing on captured images of the plurality of rope R outputted by the line-sensor camera 10.

In this embodiment, by using the line-sensor camera 10 that is capable of high-speed capturing, it is possible to capture images even when the elevator is rising or lowering at high speed.

The measuring device 20 is composed of an image-recording unit 21 for recording captured images outputted by the line-sensor camera 10, and an image-processing unit 22 for processing captured images outputted by the line-sensor camera 10.

The image-processing unit 22 executes image analysis to inspect for rope wire wear marks and wire breakage.

Captured images recorded in the image-recording unit 21 are used when checking for rope wire wear marks and wire breaks, results of image processing by the image-processing unit 22.

While position, and speed detection signals from position and speed detection means 30, such as an encoder or the like are inputted to the measuring device 20 as capture-starting trigger signals, position and speed detection signals from the position and speed detection means 30 are inputted to an elevator controller 40. The position and speed detection means 30 is disposed at the elevator hoisting machine.

The line-sensor camera 10 starts continuous capturing in sync to the capture-starting trigger signals; captured images outputted by the line-sensor camera 10 are recorded in the image-recording unit 21, and further, an image analysis is started by the image-processing unit 22.

A position signal of the elevator from the elevator controller 40 or the like, may also be inputted to the measuring device 20 as a capture-starting trigger signal, and the elevator position and camera capturing line may be synchronized. It is possible to use a position of the rope R as the elevator position.

The measuring device 20 can be implemented as hardware, but general versatility is improved by installing a predetermined software in a general personal computer. By using a laptop-type personal computer as the personal computer, portability is improved.

<Rope Wire Breakage Measurement Method>

Rope wire wear is a phenomenon in which a surface of the rope R is scraped while it is being used. If the wear of the wire advances, the wire will break.

If such a rope R is captured by the line-sensor camera 10, the surface is scraped by wear and a portion that reflects metal is captured more brightly compared to other, unscraped surfaces.

A portion where wear has advanced is treated as white, and all other areas are black, by the image-processing unit 22 binarizing the image, which is a method for treating images. With this, a state of surface wear on the rope R is measured.

Figure 3:
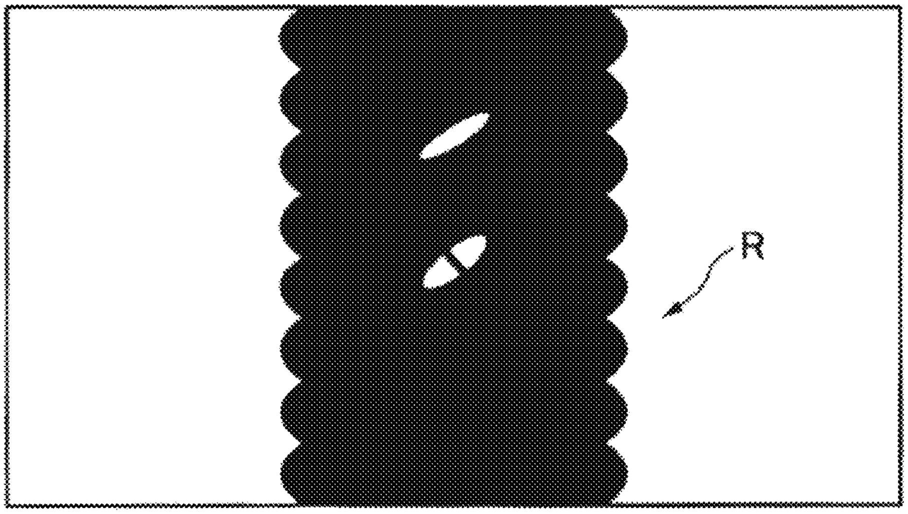
FIG. 3 is an explanatory view showing a captured image after binarization.

A result of the binarization of captured images of the rope R in which both wear and breakage have occurred is shown FIG. 3.

FIG. 3 shows binarization of captured images outputted by the line-sensor camera 10, to the measuring device 20; Up and down directions are length directions of the rope R which is a time-series direction. A horizontal direction is a thickness direction of the rope R.

As shown in FIG. 3, a portion that can be seen as white by a surface being scraped through wear is detected a plurality of places as worn locations on the surface of the rope R.

Here, the surface of the rope R is regularly uneven because of the spirally wrapped strands. An advancement of wear of the convex portions is comparatively faster than concave portions, so it is thought that the locations of wear are the convex portions. For that reason, a width of each worn location is a thickness of the strand.

It is thought that locations of wear are generated in up and down directions centering on locations that broke for the locations where breakage occurred in the wire composed of strands.

A surface of the location where the rope wire broke is concave, so metallic reflection is not generated, but is captured comparatively dark in the portion scraped on the surface through wear.

In other words, as shown in FIG. 3, an area existing between two locations of wear that exist in a lower portion of the rope R is captured dark, so while a break in the rope wire occurred, there is only one location of wear on the top portion of the rope R, so it is thought that a break in the rope wire has not occurred.

Next, a breakage detection method will be described.

In breakage detection, the image-processing unit 22 implements a labeling process on previously detected worn locations. In the labeling process, a label is assigned to identify detected wear marks.

For example, a consecutive number is assigned in order from a top in the drawing, to each location of wear, using label 1, label 2, label 3 and others, and a coordinate that indicates a position of a center of gravity of the location of the wear, and a region of the location of the wear are recorded in each label. A width of the region of the location of wear indicates an amount of wear. Also, if a leader line (black) is assigned to a black colored portion, visual identification is not possible, so a symbols are assigned in text bubbles for each label 1, 2, and 3.

Figure 4:
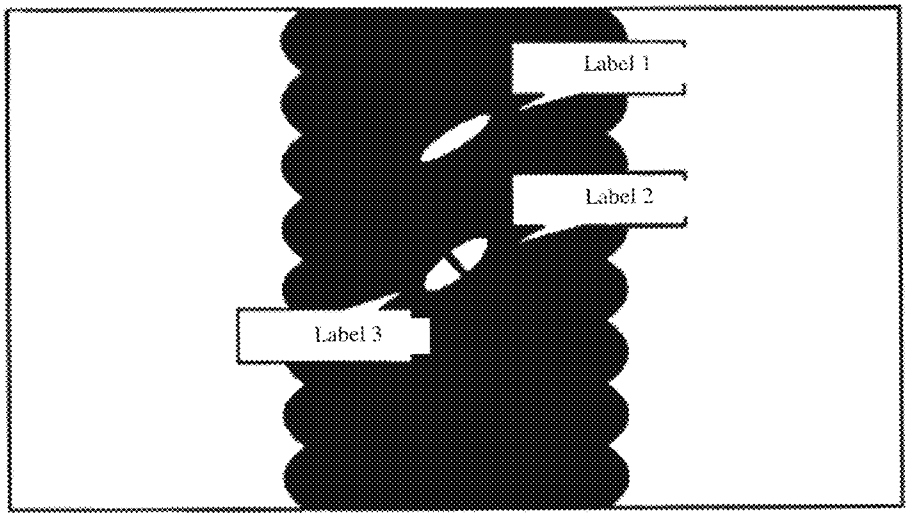
FIG. 4 is an explanatory view showing a captured image after labeling.

A result of the labeling process in FIG. 3 is shown in FIG. 4. At this time, it can be seen that a distance between detected labels at locations where a breakage occurred is close.

In other words, as shown in FIG. 4, an area existing between label 2 and 3 on a lower portion of the rope R is captured black, so the break in the rope wire has occurred, but only label 1 exists at the top portion of the rope R so it is judged that a breakage has occurred in the rope wire.

For that reason, the image-processing unit 22 detects that as a breakage, measures the distance between labels and detects a value of the distance to be a location that does not satisfy a fixed threshold. Conversely, portions whose distance between labels is separated over a fixed threshold are detected as wear marks.

In other words, if the distance between labels 2, and 3 that exist at a lower portion of the rope R in FIG. 4 is below a fixed threshold, the gap between labels 2 and 3 is judged to be a break. If the gap between labels 2 and 3 is higher than the fixed threshold, the gap between labels 2, and 3 is not judged to be a break, but labels 2, and 3 are judged to be wear marks.

Here, the fixed threshold is not limited to a thickness of the wire. A plurality of wires can break at the same time. Also, it is not a premise that the texture in the rope image is fixed.

Here, the gap between labels means the distance between any labels.

In the example described above, the distance between labels 2 and 3 that exist at the bottom portion of the rope R was compared, but comparing label 1 that exists at a top portion of the rope R and the distance between labels 2, and 3 that exist at the bottom portion of the rope R to the threshold, if it is higher than the threshold, it is judged that a breakage of the rope wire has not occurred between the label 1 and labels 2, and 3.

Figure 5:
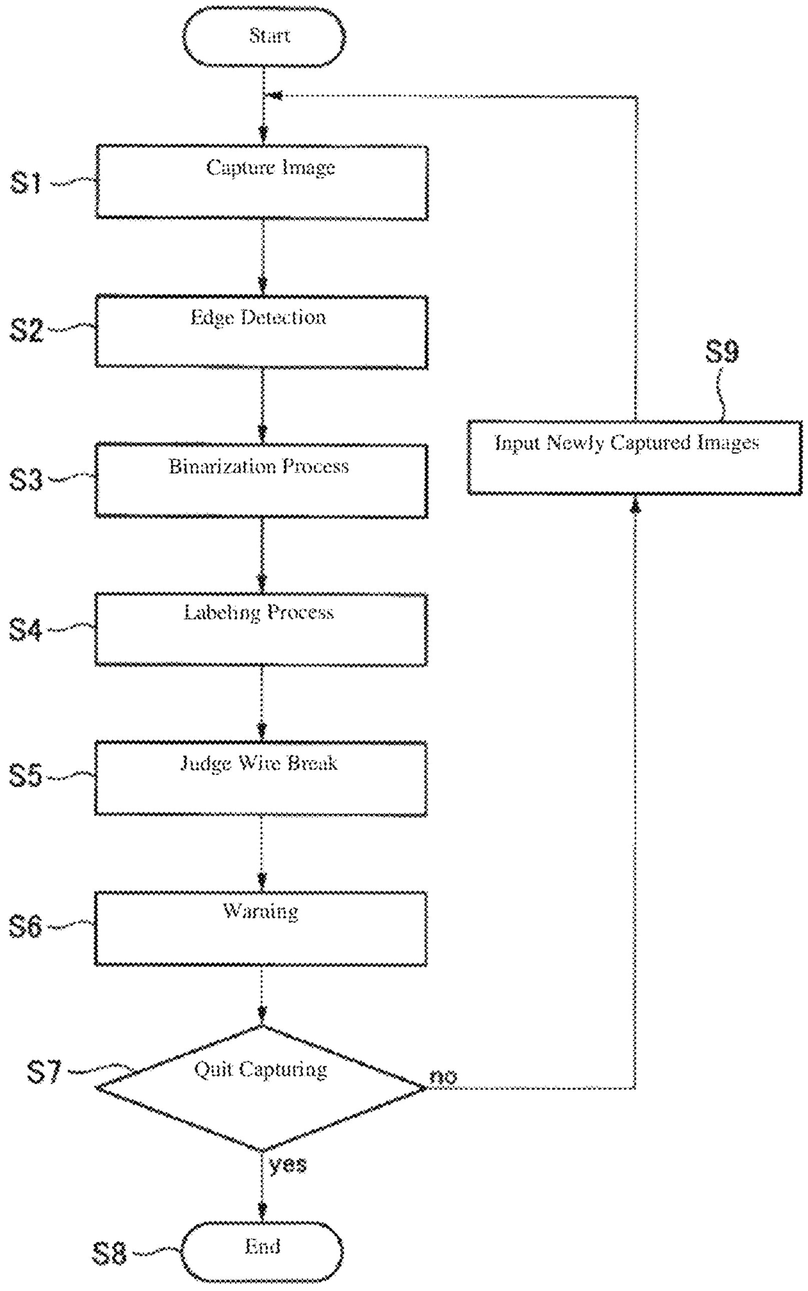
FIG. 5 is a flowchart of an elevator-rope inspection method according to the first embodiment of the present invention.

The flowchart in FIG. 5 will be used to describe an elevator-rope inspection method according to the embodiment.

(1) Image Capturing

Firstly, regularly capture a capture pitch of the rope R, by changing the camera capturing cycle, using position information obtained from the elevator controller 40. Continuously capture, regular capturing pitches with the line-sensor camera 10, and input the captured images to the measuring device 20. (Step S1)

(2) Edge Detection

Next, detect an outer circumference of the rope to detect a position of the rope R from the inputted images. (Step S2)

For example, the image of the rope R in the drawing is scanned in the horizontal direction; a location that changes from a black portion to a white portion or a location that changes from a white portion to a black portion is the rope external diameter. A surface of the rope R is regularly uneven because of the strands, so a position of the rope R based a thickness of the strands is found.

As a rope edge detection method, it is possible to detect an edge of the rope with high precision use normal edge detection by detecting the edge using sub-pixel precision that uses parabolic fitting.

At that time, it is possible to remove captured noise included in the edge by using a moving-average method on calculated edges.

(3) Binarization Process

Continuing, implement the binarization process on captured images of the rope R detected from the images. (Step S3) At that time, locations where wear is advancing are white; other areas are detected as black. In other words, the white portions are locations of wear.

(4) Labeling Process

Later, at step S3, assign a label using labeling to locations of wear detected at step S3. (Step S4) When labeling, record the region of the location of wear along with the coordinates indicating the position of the center of gravity for the locations of wear, based on the position of the rope R.

(5) Judgment of Wire Break

Also, if the distance between labels is less than a fixed threshold, judge it to be a wire break. If it is higher, judge it to be wear marks. (Step S5)

(6) Warning

Furthermore, at step S5, when it is judged to be a wire break, issue a warning. (Step S6) It is possible to implement inspections and maintenance according to the warning, so safety is increased. As means for issuing the warning, a speaker (not shown in the drawings) is built into the measuring device 20.

(7) Quit Capturing

Thereafter, judge whether capturing of a predetermined length of the rope R or an entire length is completed (step S7). When capturing is completed, end all processes. (Step S8)

(8) Input Newly Captured Images

When capturing is not ended, input newly captured images (step S9), and repeat steps S1 to S6 for all newly captured images.

As described above, according to the embodiment, firstly, captured images of the rope R are obtained from the line-sensor camera 10 (step S1), and edge processing is implemented on the obtained captured images (step S2). Next, binarization is implemented on the captured images (step S3), labels are assigned by labeling locations of wear (step S4), and next a wire break of the rope is judged using label information assigned to locations of wear (step S5) to attain the effect of being able to implement an elevator detection device that does not require obtaining data in advance.

Also, if a plurality of rope R is captured using the line-sensor camera 10, it is possible to attain the effect of measuring rope wire breaks and wear marks on a plurality of elevator rope wires. Also, the line-sensor camera 10 can capture at high speed, so an effect is attained of capturing images even when the elevator is rising and lowering at high speed.

When it is judged that the wire is broken, a warning is issued (step S6), attaining an effect of increasing safety. Furthermore, by further equipping the image-recording unit 21 to record captured images outputted by the line-sensor camera 10, an effect is attained of making it possible to check captured images when the rope wire breaks, a result of image processing by an image-processing unit 22.

Embodiment 2

Figure 2:
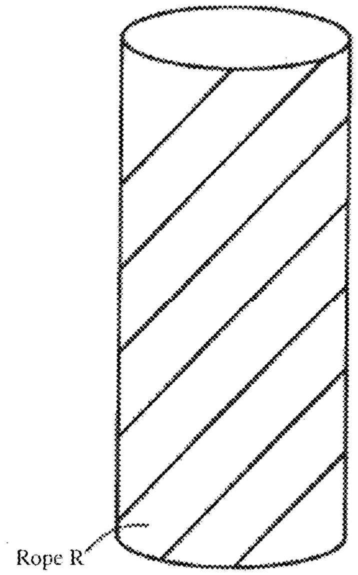
FIG. 2 is a schematic view of an elevator-rope inspection device according to a second embodiment of the present invention.
Figure 2:
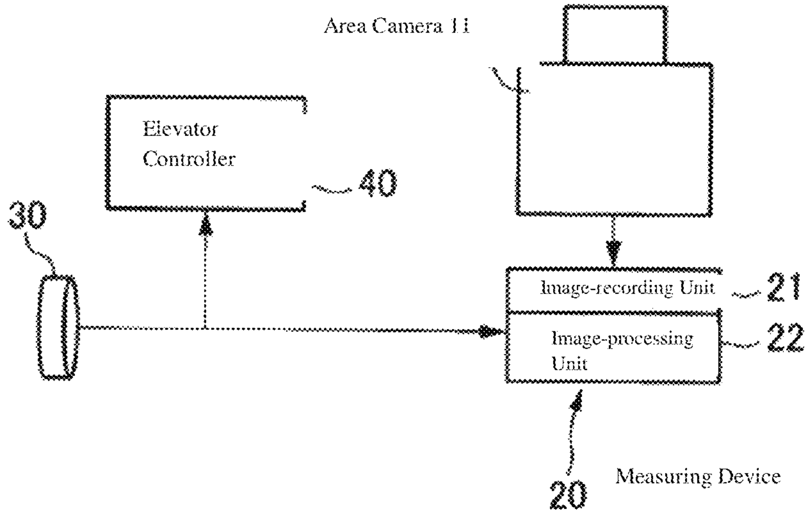

FIG. 2 is a view of an elevator-rope inspection device according to a second embodiment of the present invention.

The elevator-rope inspection device according to this embodiment can use the area camera 11 instead of the line-sensor camera 10 used in the first embodiment.

The area camera 11 is a camera arranged with a plurality of pixels vertically and horizontally, and can capture two-dimensional images of the stopped rope R with one capture. Captured two-dimensional images are outputted to the measuring device 20 as captured images.

Also, extract pixels in the horizontal direction of the area camera 11 as one line, and in the same way as the line-sensor camera 10, continually capture the moving rope R, and compose the images in time series, and output the time-series composed two-dimensional images to the measuring device 20. In other words, the area camera 11 can be used in the same way as the line-sensor camera 10. Also, by using an area camera capable of measuring color information, it is advantageous in that ex post facto confirmation is easy.

Other constitutions are the same as the first embodiment described above; the same functional effects are also attained.

INDUSTRIAL APPLICABILITY

The present invention has wide industrial applications as an elevator-rope inspection devices and an elevator-rope inspection method.

EXPLANATION OF LETTERS OR NUMERALS

1, 2, 3 Label
10 Line-sensor camera
11 Area camera
20 Measuring device
21 Image-recording unit
22 Image-processing unit
30 Speed and position-detection means
40 Elevator controller
R Elevator rope (rope)

What is claimed is:

1. An elevator-rope inspection device comprising:
a camera for capturing images of one or a plurality of elevator ropes; and
an image-processing unit for processing a captured image outputted by the camera;
wherein the image-processing unit:
detects locations of wear from captured images;
implements a labeling process that assigns a label to each location of wear;
measures a distance between labels assigned in the labeling process to determine a label gap, and
judges the label gap to be a wire break in response to the distance between the labels being less than a fixed value.

2. The elevator-rope inspection device according to claim 1, wherein the locations of wear are detected by implementing a binarization process on captured images.

3. The elevator-rope inspection device according to claim 1, wherein the image-processing unit assigns consecutive numbers to the locations of wear when implementing the labeling process, and records a coordinate of a position of the locations of wear and a region of the locations of wear as an amount of wear.

4. The elevator-rope inspection device according to claim 1, wherein the image-processing unit issues a warning upon detecting the wire break.

5. The elevator-rope inspection device according to claim 1, wherein the camera comprises a line-sensor camera or an area camera.

6. The elevator-rope inspection device according to claim 1, further comprising an image-recording unit for recording captured images outputted by the camera.

7. An elevator-rope inspection method for capturing one or a plurality of elevator ropes with a camera and processing captured images, wherein in an image-processing unit:
locations of wear are detected using the captured images,
a label is assigned to each location of wear,
a distance between labels assigned is measured to determine a label gap, and
the label gap is judged to be a wire break in response to the label gap being less than a fixed value.

8. The elevator-rope inspection method according to claim 7, wherein the locations of wear are detected by implementing a binarization process on captured images.

9. The elevator-rope inspection method according to claim 7, wherein a consecutive number is assigned to the locations of wear, during labeling, and a coordinate of a position of the locations of wear and a region of the locations of wear are recorded as an amount of wear.

10. The elevator-rope inspection method according to claim 7, wherein a warning is issued upon detecting the wire break.

11. The elevator-rope inspection method according to claim 7, wherein a line-sensor camera or an area camera is used as the camera.

12. The elevator-rope inspection method according to claim 7, further comprising recording captured images outputted by the camera.

* * * * *